Dec. 4, 1951  J. R. ZWICKL  2,577,598
WATER REMOVER AND AIR CONCENTRATOR FOR REFRIGERATING SYSTEMS
Filed April 1, 1950  2 SHEETS—SHEET 1

JOSEPH R. ZWICKL
INVENTOR.

BY

JOSEPH R. ZWICKL
INVENTOR.

BY

Patented Dec. 4, 1951

2,577,598

UNITED STATES PATENT OFFICE 2,577,598

WATER REMOVER AND AIR CONCENTRATOR FOR REFRIGERATING SYSTEMS

Joseph R. Zwickl, East Orange, N. J., assignor to Worthington Pump and Machinery Corporation, Harrison, N. J., a corporation of Delaware Application April 1, 1950, Serial No. 153,318

9 Claims. (Cl. 62—117.85)

This invention relates to refrigeration systems and more particularly to apparatus for removing water from and concentrating air in the system.

The present invention is particularly adapted for use in closed refrigerating systems wherein a volatile refrigerant, such as those of the Freon group, is circulated through a closed system embodying an evaporator or cooler, a compressor and a condenser. If such systems operate below atmospheric pressures they are subject to inleakage of air with its contained water vapor which causes pollution or fouling of the refrigerant. Such pollution or fouling of the refrigerant interferes with the effectiveness of the system and hence it is desirable, even necessary, to remove the polluting agents from the refrigerant in the system.

The present invention relates to a water remover and air concentrator which acts also as a separator for water and volatile refrigerant in a purging system for refrigerating systems such as disclosed in my prior Patent No. 2,450,707, issued October 5, 1948. The water remover and air concentrator will, by its removal of water from the system, materially reduce the necessary operating time of the purge compressor, thereby increasing the operating life of the compressor as well as resulting in a savings of operating power of the apparatus.

An object of the present invention is to provide a water remover or separator as specified, which is comparatively simple in construction and which may be economically manufactured, one form of the separator which comprises the present invention being built up in the greater part of its structure from elements of standard manufacture which may be purchased economically upon the open market.

With these and other objects in view, as may appear from the accompanying specification, the invention consists of various features of construction and combination of parts, which will be first described in connection with the accompanying drawings, showing a water remover and air concentrator for refrigerating systems of a preferred form embodying the invention, and the features forming the invention will be specifically pointed out in the claims.

Figure 1:
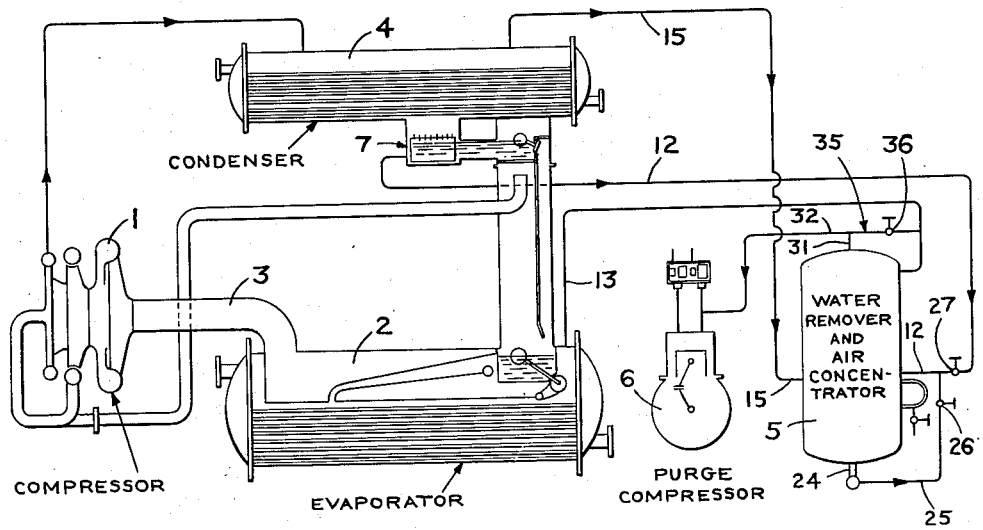
Figure 1 is a diagrammatic view of a refrigerating system embodying the improved water remover and air concentrator.

Referring more particularly to the drawings, the refrigerating system shown diagrammatically in Figure 1 of the drawings includes a compressor 1 which is illustrated as a centrifugal compressor, although the use of the water remover and air concentrator is not necessarily limited to systems embodying centrifugal compressors. The compressor 1 receives the vaporized refrigerant from the evaporator or cooler 2 through a suitable type of connection 3, compresses it and discharges it into the condenser 4 as is usual in closed refrigeration systems. The water remover and air concentrator 5 is connected in the system so as to remove water from the refrigerant and concentrate air so that the air may be removed from the system by the purge compressor 6 in the usual manner.

Figure 2:
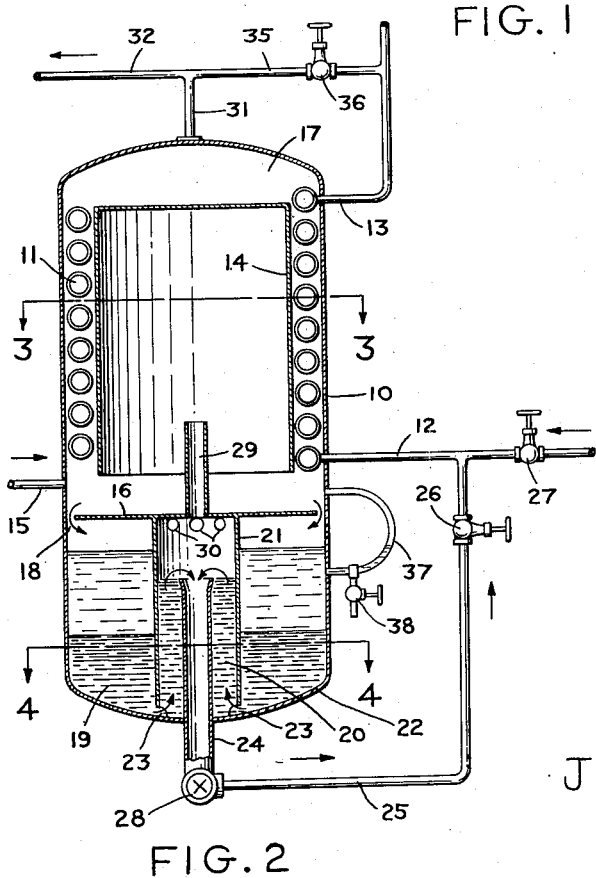
Figure 2 is a vertical section through one form of the water remover and air concentrator.
Figure 3:
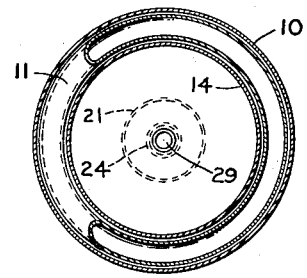
Figure 3 is a cross section taken on the line 3—3 of Figure 2.
Figure 4:
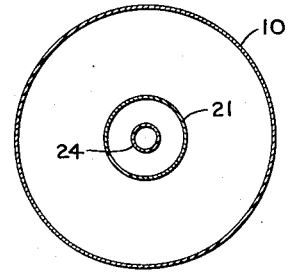
Figure 4 is a cross section taken on the line 4—4 of Figure 2.

In the form of water remover and air concentrator shown in Figures 2 to 4, inclusive, of the drawings, a shell 10 is provided which has a heat exchange element 11 mounted therein. In this form of the invention the heat exchange element 11 is in the form of a coil of pipe, the inlet of which is connected through expansion valve 27 and a pipe 12 to the hot well 7 of the condenser 4, and the outlet of the coil 11 is connected by a pipe 13 to the evaporator or cooler 2 so that liquid refrigerant from the hot well 7 of the condenser can expand into the coil 11 and vaporize in the coil, then pass as cold gas to the evaporator 2. A bell-like member 14 is mounted in the shell 10 and within the coil 11, as clearly shown in Figure 2 of the drawings. Gas or vaporized refrigerant, water vapor and air are taken from the top of the condenser 4 through a pipe 15 and delivered to the interior of the shell 10 about the coil 11. The liquid refrigerant vaporizing in passing through the coil serves to condense the condensible vapors causing them to fall in a liquid state upon the horizontal baffle 16 which extends across the interior of the shell 10 below the coil 11. The non-condensible vapor such as air passes to the top of the shell and collects in the space 17 above the top of the element 14. The baffle 16 is arranged so as to provide an annular space, indicated at 18, through which the condensed refrigerant and water flow into the separation compartment or space 19 within the shell. The refrigerant, being heavier than the water, sinks to the bottom of the separation space 19, and the water collects on the top of the refrigerant. A refrigerant compartment 20 is formed in the separation space 19 by a suitable baffle or partition structure 21, the top of which is attached in any suitable manner to the baffle 16 while the bottom is attached to the interior of the bottom 22 of the shell 10. The partition 21 has openings 23 in its lowermost portion so that the liquid refrigerant will pass through the openings 23 into the refrigerant compartment 20. An overflow riser 24 rises centrally within the refrigeration compartment 20 and when the liquid refrigerant reaches the top of the riser 24 it overflows thereinto and outwardly therefrom into a pipe 25, through an expansion valve 26 in the pipe into the pipe 12 to be returned through the heat exchange element or coil 11 into the evaporator through pipe 13.

A sight glass 28 may be located at the junction between the riser 24 and the pipe 25 so as to permit visualization of the flow of the liquid refrigerant from the refrigerant compartment 20.

A pressure equalizing pipe 29 is attached to the baffle or partition 16 and has its lower end opening into the refrigerant compartment 20 and its upper end opening into the space within the bell-like member 14 so as to provide for equalization of the pressure within the interior of the shell above the partition 16 and in the refrigerant compartment 20. The partition 21 is also provided with a plurality of pressure equalizing openings 30 therein near its open end which open into the separation space at the top thereof.

A pipe 31 is connected to the space at the top of the shell 10 above the coil 11 and bell 14 and this pipe 31 is connected by pipe 32 to the purge compressor 6 so that air may be withdrawn from the shell and expelled from the system by the purge compressor. The concentration of the air in the space 17 is substantially greater than is the concentration of air in the main condenser and therefore the removal of the air by the purge compressor 6 is proportionately faster, thus cutting down the time needed to remove the air and other foul gases from the system.

When there is no sign of air in the system the purge compressor is shut down. However, in order to maintain a continuous water removal, we must prevent vapor binding within the shell 10 by maintaining a small vapor circulation through it. This is accomplished by continuously bleeding a small amount through pipe 35 and needle valve 36 into the main evaporator.

A sight glass or water level indicator 37 is connected to the shell 10 with its inlet opening into the shell in the separating space 19. A water drain pipe and valve structure 38 is connected to the water level indicator 37 and when the water rises in this indicator 37 to a point to show a comparatively dangerous level of water in the separation space 19, the valve 38 is opened and the water drained from the system.

Figures 5, 6, 7:
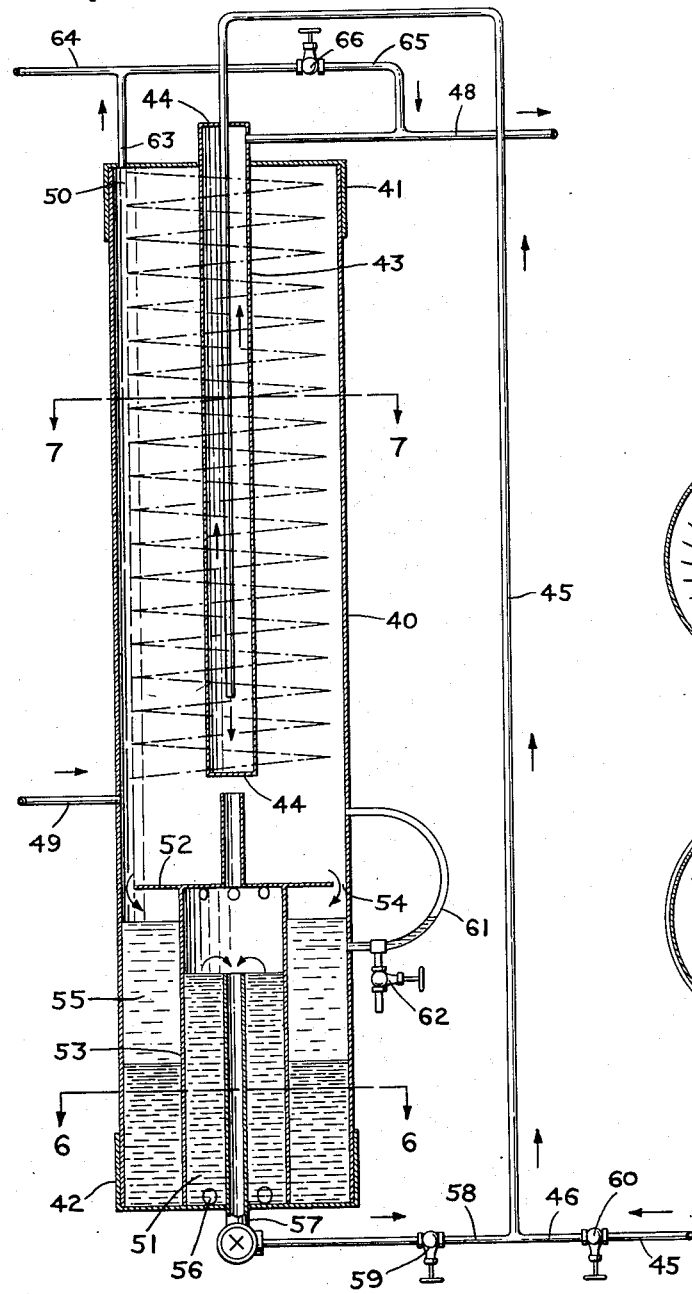
Figure 5 is a vertical section through a modified form of the water remover and air concentrator.
Figure 6 is a horizontal section taken on the line 6—6 of Figure 5.
Figure 7 is a horizontal section taken on the line 7—7 of Figure 5.

The modified form of the invention shown in Figures 5 to 7, inclusively, operates in the same manner and is connected in the refrigeration system in the same manner as the form of the invention shown in Figures 2 to 4, inclusive. However, this modified form of the invention is made up in the major part of elements of standard manufacture.

The shell 40 is a piece of commercial tubing of suitable interior diameter, the ends of which are closed by caps 41 and 42 mounted thereon and suitably attached thereto. The heat exchange element which is mounted within the tubular shell 40 is constructed of a length of the extended radiation surface tubing, well known and used in the refrigeration art. In the drawings, this tubing is shown as a length of tube having a plurality of spines on its outer side such as that disclosed in Patent No. 2,200,502, but it is to be understood that the usual type of finned tubing, i. e., tubing having a spirally wound thin fin on its outer side or surface, may be employed in lieu of the spined tubing shown. Both ends of the tube 43 which has the extended radiation surface on its outer side is closed as shown at 44 and the upper end projects outwardly through the cap 41 on the top of the tubular shell 40. A pipe 45 extends downwardly into the tube 43 for the major portion of the length of the tube, opening out into the tube a predetermined distance inwardly from the bottom thereof. The pipe 45 is in turn connected to a pipe 46 which corresponds to the pipe 12 shown in Figure 2 of the drawings and which is connected to the hot well 7 of the condenser 4 for supplying liquid refrigerant to the interior of the tube 43. The liquid refrigerant passes from the pipe 45 into the tube 43 and moves upwardly through this tube and passes through a pipe 48 as vapor to the evaporator 2. The pipe 48 corresponds to the pipe 13 shown in Figure 1 of the drawings.

A refrigerant compartment 51 is formed in the lower portion of the tubular shell 40 by a length of tubing of suitable diameter, the bottom or lower end of which is attached to the cap 42 at the bottom of the tubular shell 40. A plate 52 is attached to the top of the tube 53 which forms the refrigerant compartment 51 and it provides the baffle corresponding to the baffle 16 upon which the condensed refrigerant and water fall. The condensed refrigerant and water pass through the space 54 about the baffle 52 into the separation compartment 55 where the water and the condensed refrigerant separate out, due to the difference in their densities. The liquid refrigerant passes through suitable openings 56 in the tube 53 into the refrigerant compartment 51. A riser 57, formed of a suitable length of pipe, extends upwardly into the refrigerant compartment 51 and the liquid refrigerant overflows into this pipe or riser and from thence into a pipe 58 which is connected to the pipe 45. Expansion valves 59 and 60 are provided in the pipes 58 and 45. A water level indicator 61 is connected to the tubular shell 40, having its lower end opening into the separation space 55. A draincock 62 is connected to the water level indicator 61 so that water may be drawn from the separation compartment 55 by opening the draincock 62.

The space 50 in which the air and other non-condensible gases accumulate is connected by a pipe 63 with the pipe 64 which corresponds to the pipe 32 and leads to the purge compressor 6. A by-pass pipe 65 corresponding to the by-pass pipe 35 is connected to the pipe 63 and to the pipe 48. This pipe has a valve 66 therein so that when there is no air concentrated in the space 50 and, consequently, no air or a very little quantity thereof in the system, vapor may be by-passed to prevent vapor binding of the interior of the tubular shell 40.

What is claimed is:

1. In a refrigerating system containing a volatile refrigerant and including a condenser and an evaporator, means for purging the system of polluting condensibles including a separator structure embodying a shell, a heat exchange element in said shell, means for delivering refrigerent to said heat exchange element, means for delivering non-condensible gases mixed with condensible vapors from the condenser to said heat exchange element to provide condensation of the condensible vapors, a partition in said shell forming a separation space therein below said heat exchange element into which the condensed vapors pass, a partition in said separation space forming a refrigerent compartment in said separation space, said partition having openings therein at its lowermost portion establishing communication between the separation space and refrigerant compartment, said partition having an opening in its uppermost portion having restricted communication between the refrigerant space and the space in said shell surrounding said heat exchanger to equalize the pressure in the shell and refrigerent compartment, and means for withdrawing the separated out polluting condensate from said separation space.

2. In a refrigerating system containing a volatile refrigerant and including a condenser and an evaporator, means for purging the system of polluting condensibles including a separator structure embodying a shell, a heat exchange element in said shell, means for delivering liquid refrigerant to said heat exchange element, means for delivering non-condensible gases mixed with condensible vapors from the condenser into said shell to provide condensation of the condensible vapors by said heat exchange element, said shell having a separation space therein below said heat exchange element into which the condensed vapors pass, a partition forming a refrigerant compartment in said separation space, a baffle supported by said partition and providing restricted communication between the space in the shell surrounding said heat exchange element and said separation space, a riser extending upwardly in said refrigerant compartment for maintaining a predetermined level of condensed refrigerant in the refrigerant compartment, means for withdrawing separated out polluting condensate from said separation space.

3. In a refrigerating system containing a volatile refrigerant and including a condenser and an evaporator, a foul condensible vapor remover and non-condensible vapor concentrator including, a shell comprising a tubular body, sealing caps on each end of the body, a heat exchanger in said shell and consisting of a tube having its ends closed and having extended radiation surface on its outer side, said shell having a separation space therein below said heat exchanger, a refrigerant compartment in said separation space and formed of a second tube having its lower end attached to the sealing cap at the bottom of the tubular body, said second tube provided with an opening at its lowermost portion opening into said separation space, a partition baffle attached to the top of said second tube and providing restricted communication between said separating space and the space within said shell surrounding said heat exchanger tubular body, means for delivering condensible and non-condensible vapor from the condenser into said shell about the heat exchanger, and means for delivering liquid refrigerant into said heat exchanger tubular body.

4. In a refrigerating system containing a volatile refrigerant and including a condenser and an evaporator, a foul condensible vapor remover and non-condensible vapor concentrator including, a shell comprising a tubular body, sealing caps on each end of the body, a heat exchanger in said shell and consisting of a tube having its ends closed and having extended radiation surface on its outer side, said shell having a separation space therein below said heat exchanger, a refrigerant compartment in said separation space and having communication with the separation space only at its lowermost portion, means providing pressure equalizing restricted communication between the space in the shell surrounding said heat exchanger and the interior of said refrigerant compartment, and means for withdrawing separated out polluting condensate from said separation space.

5. In a refrigerating system containing a volatile refrigerant and including a condenser and an evaporator, a foul condensible vapor remover and non-condensible vapor concentrator including, a shell comprising a tubular body, sealing caps on each end of the body, a heat exchanger in said shell and consisting of a tube having its ends closed and having extended radiation surface on its outer side, said shell having a separation space therein below said heat exchanger, a refrigerant compartment in said separation space and formed of a second tube having its lower end attached to the sealing cap at the bottom of the tubular body, said second tube provided with an opening at its lowermost portion opening into said separation space, a partition baffle attached to the top of said second tube and providing restricted communication between said separating space and the space within said shell surrounding said heat exchanger tubular body, means for delivering condensible and non-condensible vapor from the condenser into said shell about the heat exchanger, means for delivering liquid refrigerant into said heat exchanger tubular body, means for maintaining a predetermined level of condensed refrigerant in said refrigerant compartment, and means for delivering liquid refrigerant from said refrigerant compartment to said heat exchanger.

6. A refrigerating system as claimed in claim 3 wherein a pressure equalizing tube is connected to said partitioned baffle and is open to the interior of said separating space and the space within the shell surrounding the heat exchanger tubular body to provide equalization of pressure within the interior of the shell and said separation space.

7. A refrigerating system as claimed in claim 2 wherein said means for withdrawing separated out polluting condensate from said separation space includes visual means whereby the quantity of polluting condensate in the separation space may be determined and a manually operated valve operable to permit withdrawing of the polluting condensate from the separation space.

8. A refrigerating system as claimed in claim 1 including an outlet riser for maintaining a predetermined level of condensed refrigerant in said refrigerant compartment, and means for delivering condensed refrigerant from said compartment to said heat exchanger.

9. A refrigerating system as claimed in claim 5 wherein said means for delivering liquid refrigerant into said heat exchanger tubular body includes an open ended riser extending upwardly into the refrigerant compartment to maintain a predetermined level having refrigerant in the refrigerant compartment.

JOSEPH R. ZWICKL.

REFERENCES CITED

The following references are of record in the file of this patent:

UNITED STATES PATENTS

| Number | Name | Date |
| --- | --- | --- |
| 1,911,464 | Pearson | May 30, 1933 |
| 2,202,010 | Kondolf | May 28, 1940 |
| 2,400,620 | Zwickl | May 21, 1946 |
| 2,449,688 | Brinkoeter | Sept. 21, 1948 |
| 2,464,631 | Zwickl | Mar. 15, 1949 |